United States Patent [19]

Becker et al.

[11] Patent Number: 4,493,753
[45] Date of Patent: Jan. 15, 1985

[54] METHOD FOR PRODUCING SEPARATING NOZZLE ELEMENTS FOR THE SEPARATION OF FLUID MIXTURES

[75] Inventors: Erwin Becker; Wolfgang Ehrfeld, both of Karlsruhe; Dietrich Münchmeyer, Weingarten; Hans Betz; Anton Heuberger, both of Munich, all of Fed. Rep. of Germany

[73] Assignee: Kernforschungszentrum Karlsruhe GmbH, Karlsruhe, Fed. Rep. of Germany

[21] Appl. No.: 502,721

[22] Filed: Jun. 9, 1983

[30] Foreign Application Priority Data

Jun. 11, 1982 [DE] Fed. Rep. of Germany ....... 3221981

[51] Int. Cl.³ .......................... C25D 1/02; C25D 1/20
[52] U.S. Cl. ............................................. 204/9; 204/11
[58] Field of Search ............................ 204/3, 4, 9, 11

[56] References Cited

U.S. PATENT DOCUMENTS

| | | | |
|---|---|---|---|
| 3,342,706 | 9/1967 | Tiben | 204/3 |
| 3,668,080 | 6/1972 | Weber | 204/9 |
| 4,080,267 | 3/1978 | Castellani | 204/11 |
| 4,351,653 | 9/1982 | Becker et al. | 204/11 |
| 4,422,905 | 12/1983 | Becker et al. | 204/9 |

FOREIGN PATENT DOCUMENTS

| | | | |
|---|---|---|---|
| 2009265 | 10/1972 | Fed. Rep. of Germany | 204/11 |
| 3007385 | 9/1981 | Fed. Rep. of Germany | |
| 3039110 | 5/1982 | Fed. Rep. of Germany | |
| 51-37618 | 10/1976 | Japan | 204/3 |

OTHER PUBLICATIONS

Plating, Jul. 1965, pp. 673–676.
Moran et al., "High Resolution, Steep Profile Resist Patterns", J. Vac. Sci. Technol., vol. 16, No. 6, Nov., Dec., 1979, (pp. 1620–1624).
Becker et al., "Uranium Enrichment by the Separation-Nozzle Process", Naturwissenschaften (Natural Sciences), 63, pp. 407–411 (1976).
Bowden et al., "Resist Materials for Fine Line Lithography", Solid State Technology, May, 1979, pp. 72–82.
E. Bartholome et al., "Die Chemische Fabrik", vol. 39, 1967, p. 4, Chemie Ingenieur Technik.

Primary Examiner—Thomas Tufariello
Attorney, Agent, or Firm—Spencer & Frank

[57] ABSTRACT

A separating nozzle element composed of a separating body and two cover plates between which the body is interposed, the nozzle element being used for the separation of gaseous or vaporous mixtures, is produced by providing a layer of a material whose ability to be removed from the layer can be altered by irradiation, the thickness of the layer being approximately equal to the thickness of the separating body, irradiating the layer, starting at one surface, with radiation which has a penetration depth into the material of the layer which is less than the thickness of the layer, in a pattern corresponding to the cross section of the separating body structure, and removing from the layer material which is more easily removable as a result of the irradiation, to thereby permit the radiation to penetrate to greater distances from the one surface, while continuing the removal of material until the entire thickness of the layer has been subjected to radiation and removal, to form a mold of the separating body. The mold is then filled with material constituting the separating body, whereafter the mold is removed.

11 Claims, 8 Drawing Figures

METHOD FOR PRODUCING SEPARATING NOZZLE ELEMENTS FOR THE SEPARATION OF FLUID MIXTURES

BACKGROUND OF THE INVENTION

The present invention relates to a method for producing separating nozzle elements composed of a separating body and cover plates for the separation of gaseous or vaporous mixtures. Gaseous or vaporous mixtures are understood to mean particularly isotope mixtures such as $^{235}UF_6$ and $^{238}UF_6$ which, due to their chemical properties, make particular demands on the material of the separating nozzle elements.

In the separating nozzle process, the gas pressure corresponding to the minimum specific energy consumption is inversely proportional to the characteristic dimensions of the separating nozzles, as described in the publication Chemie Ing. Technik 39 (1967), at page 4. Since the costs for compressors, pipelines, valves and control devices required to perform this process decrease considerably with increasing gas pressure, the characteristic dimensions of the separating nozzles must be selected to be as small as possible. The narrowest widths of the separating slits in separating nozzles encountered today are between 10 and 3 $\mu$m, which corresponds to presently employed or desired inlet pressures of between 0.5 and 1.5 bar.

To produce separating nozzle elements having particulary small characteristic dimensions it is known to assemble the separating nozzle elements from separating bodies and cover plates. The separating bodies are then penetrated by separating nozzles and gas conduits, while the cover plates include channels for the intake and discharge of the gas or vapor streams.

At the locations where the slit-shaped separating nozzles are terminated by the cover plates, there occurs, of course, a deceleration of the gas stream which is determinative for the separation and results in a loss of separating output. This loss is the greater, the smaller the ratio of the thickness of the separating body to the narrowest width of the separating slit, or separating body aspect ratio. To keep separating output losses sufficiently low, separating body aspect ratios of between 100 and 200 must be approached. With a value of 3 $\mu$m for the narrowest width of the separating slit, the separating bodies should thus have a thickness of between 300 and 600 $\mu$m.

Separating bodies having such aspect ratios of this order of magnitude and narrowest widths of a few microns for their separating slits can be produced, in principle, by partially irradiating a plate or laminar material, i.e. mold material, whose properties can be altered by high energy radiation, and partially removing mold material based on the altered properties resulting from the irradiation so as to produce a mold containing openings defining the separating nozzles and gas conduits, and then filling the openings with a material compatible with the mixture to be separated (structure material) whereupon the mold material is removed.

In the practical application of this basic principle, however, the problem is encountered that the high energy radiation which penetrates a mold material layer of the desired thickness of the separating body (300 to 600 $\mu$m, as discussed above) causes secondary processes in the presently known materials and these secondary processes worsen the spatial resolution capability to such a degree that the required tolerances for the narrow separating slits are not realized with certainty.

German Pat. No. 2,922,642, corresponding to Becker et al U.S. application No. 155,652 filed Jun. 2nd, 1980, issued Dec. 27, 1983 as U.S. Pat. No. 4,422,905, therefore discloses a separating element composed of a plurality of stacked plates which, each by itself, may have a much smaller aspect ratio. Aside from the fact that the requirements for precision in mutually aligning the plates to be stacked and their mutual sealing constitute engineering problems, this method requires that the material forming the separating nozzles and gas conduit be contiguous in space and this may lead to technical and economical drawbacks.

German Pat. No. 2,933,570, and counterpart U.S. Pat. No. 4,351,653 to Becker et al, propose that individual layers of the mold material be placed on top of one another in steps until the desired total thickness of the separating body is reached and each layer, after having been partially irradiated and having parts of the mold material removed, is filled with structure material. This eliminates the sealing problems and it becomes possible to achieve separating bodies in which the material forming the separating nozzles and gas conduits is not spatially contiguous, as shown in FIGS. 7 and 8 of the above patents.

The stepwise application of the mold material and the stepwise filling with structure material is relatively complicated.

SUMMARY OF THE INVENTION

It is an object of the present invention to provide a process of the above-mentioned type in which only one layer of mold material is employed to produce a separating body without loss of spatial resolution.

The above and other objects are achieved, according to the invention, by a method for producing a separating nozzle element composed of a separating body and two cover plates between which the body is interposed, the nozzle element being used for the separation of gaseous or vaporous mixtures, which method is carried out by:

providing a layer of material whose ability to be removed from the layer can be altered by irradiation with radiation of a selected type, the thickness of the layer being approximately equal to the thickness of the separating body;

irradiating the layer, starting at one surface, with radiation which is of the selected type and which has a penetration depth into the material of the layer which is less than the thickness of the layer, in a pattern corresponding to the nozzle contour;

removing from the layer material which is more easily removable as a result of such irradiation step to form a mold of the separating body; and filling the mold with structure material which is compatible with the mixtures to be separated and removing the material constituting the mold to create the separating body;

wherein the steps of irradiating and removing material which is more easily removable include removing material at successively increasing distances from the one surface while causing the radiation to penetrate the material at successively increasing distances from the one surface as a result of the removal of the material.

With the method according to the present invention it is possible, in a surprising manner, to work the separating nozzles with the required precision into material layers whose thickness is a multiple of the penetration depth of the radiation employed so that it becomes possible to produce the separating bodies with only a single layer of mold material.

In the process according to the invention in which irradiation and removal occur alternatingly, X-ray radiation produced by electron synchrotrons or electron storage rings has been found to be particularly acceptable as high energy radiation, while for the process according to the invention in which irradiation and removal continue simultaneously, corpuscular rays are advisably employed.

If X-rays are used, the confinement of the radiation to certain regions of the mold material layers is realized by masks which are advisably firmly attached to the surface of the mold material layers facing the radiation source. This firm attachment eliminates the need for repeated adjustment of the mask with respect to the already structured mold material during multiple alternating irradiation and partial removal of mold material.

If corpuscular rays are used, the confinement of the radiation can be realized not only by using a mask but also by using a beam having a very small cross section which is deflected under control of electrical and/or magnetic fields across the regions of the mold material layers to be irradiated.

According to a particular embodiment, the mold material layer is attached to a cover plate before the partial irradiation and partial removal. By electrochemically filling the negative of the separating nozzles and gas conduits and using the cover plate as an electrode, it is possible to realize in a simple manner a firm connection between the separating body and the cover plate.

The combination of separating body and cover plate can be completed by a second cover plate to thus constitute a separating nozzle element. It is also possible, however, to produce two combinations of separating bodies and cover plates at a time in which case the separating bodies are applied to the cover plates in a mirror image and are combined into separating nozzle elements when aligned flush with one another. In this way the separating body aspect ratio is doubled or the thickness of the material layers to be processed at one time is cut in half, respectively.

The advantages of the method according to the present invention are particularly noticeable if the separating elements, as disclosed in German Pat. No. 2,933,570, include gas collecting chambers in addition to the separating nozzles and gas conduits. In order to keep the flow resistance of the gas collecting chamber and the resulting additional energy consumption of the separating nozzle process low, the gas collecting chambers must have a sufficiently large cross section. In practice this has the result that the portion of the mold material layers processed according to the present invention for the gas collecting chambers may be substantially larger than the portion appropriated for the separating nozzles. It is therefore proposed to enlarge the cross sectional areas of the gas collecting chambers by recesses provided in at least one of the two cover plates. It has been found that this considerably reduces the total costs for the production of the separating nozzle elements including the separating bodies and the cover plates without increasing energy consumption.

The process according to the present invention will now be described in greater detail with reference to the drawing.

DESCRIPTION OF THE PREFERRED EMBODIMENTS

Figure 1:
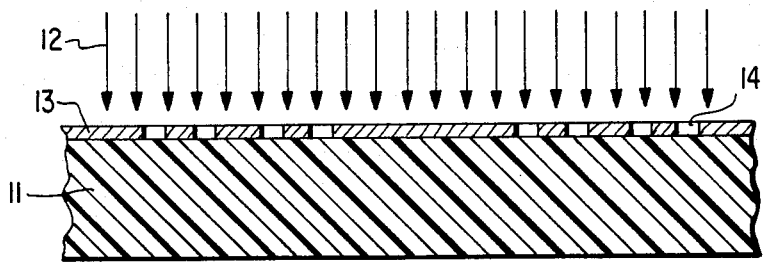
FIGS. 1, 2 and 3 are cross-sectional detail views showing succesive stages in the formation of a mold according to the invention.

FIG. 1 shows a mold material layer 11 whose thickness is substantially greater than the inherent penetration depth of radiation 12. A mask 13 is firmly attached to the surface of mold material layer 11 facing the source of radiation 12. The mask 13 is provided with openings 14 for the passage of radiation 12 at the locations intended for the partial removal of the mold material.

Figure 2:
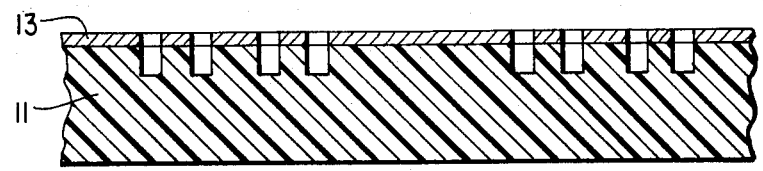

FIG. 2 shows, for the process according to claim 1, the state after one-time partial irradiation and one-time partial removal of irradiated mold material. For those processes according to the invention in which irradiation and removal are continued simultaneously, this state is achieved in a fraction of the processing time required for complete penetration of mold material layer 11.

Figure 3:
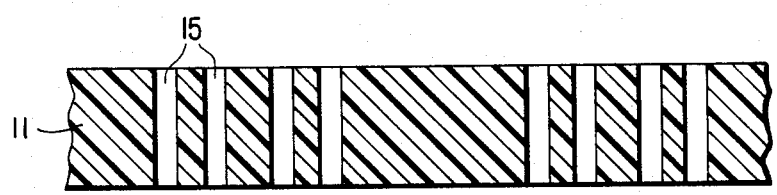

FIG. 3 shows the finished mold in which the openings 15 constituting the negative of the separating nozzles and gas conduits completely penetrate the mold material layer 11 and mask 13 has been removed.

Figure 4:
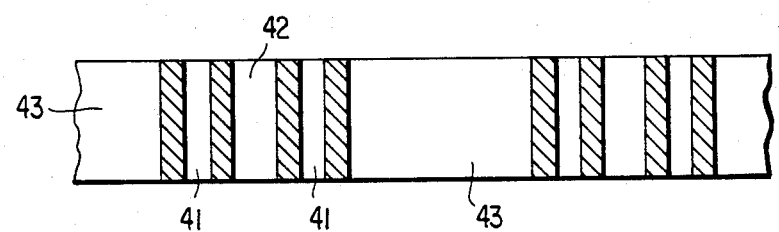
FIG. 4 is a view similar to those of FIGS. 1–3, showing the separating body formed from the mold according to the invention.

FIG. 4 shows the separating element produced by filling openings 15 of FIG. 3 with structure material and subsequent removal of the mold material. The openings provided in the separating element include separating nozzles 41, gas conduits 42 and gas collecting chambers 43.

Figure 5:
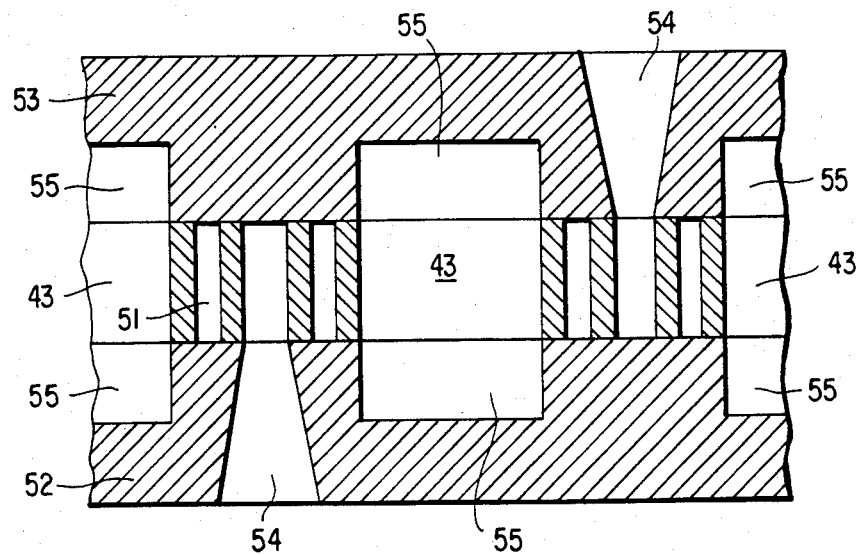
FIG. 5 is a corresponding cross-sectional detail view of a separating nozzle element composed of the body of FIG. 4 and cover plates.

FIG. 5 shows a separating nozzle structure including, at 51, the separating nozzle shown in FIG. 4, cover plates 52 and 53. The cover plates include, in addition to the usual channels 54 for the intake and discharge of the gas streams, recesses 55 applied according to the invention for increasing the cross-sectional area of the gas collection chambers 43.

A specific example of the invention will now be described.

In the manner described in German Auslegeschrift (Published Patent Application) DE-AS No. 3,007,385, a 300 μm thick foil was hot rolled using PMMA granulate (DuPont Type 2010). This constitutes the mold layer 11. A 10 μm thick foil of copper beryllium (described, e.g., in Naturwissenschaften (Natural Sciences) 63 (1976), page 409) structured according to the ph(oto-etching method was glued to this mold material layer with cyanacrylate so as to serve as mask 13. The mold layer was then irradiated through the openings 14 in mask 13 with X-rays from an electron synchrotron at a dose of 500 J/cm$^3$, the characteristic wavelength of the X-rays being 0.7 nm. The penetration depth of the radiation was about 30 μm, i.e. was considerably less than the 300 μm thickness of the mold material layer. Thereafter, the irradiated regions of mold layer 11 were removed with the use of a special developer as disclosed in German Patent Application No. P 30 39 110.7 at a working temperature of 35° C. by immersion development. After rinsing and drying, irradiation and developing were repeated in alternation so that in a total of 10 steps the mold for the separating body could be formed through the full thickness of the mold material without loss of spatial resolution.

A further example illustrates the continuous and concurrent irradiation and removal of irradiated material.

In this case, the so-called vapour development method is applied which is based on the degradation of irradiated polymers into gaseous or vaporous products. Such a material is e.g. poly butene-1-sulfone (PBS) which is converted into $SO_2$, butene and other low molecular weight products when irradiated by a high intensity electron beam or electromagnetic radiation. A sufficient dose for vapour development of PBS is 1000 $J/cm^3$. The gaseous or vaporous products are pumped off continuously at very low pressure. In this way, scattering and attenuation of the irradiating beam remain below a tolerable limit and a continuous and concurrent irradiation and removal of irradiated material are achieved. PBS and its vapour development are described e.g. in "Solid State Technology", May 1979, pages 72–82 (Resist Materials, Fine Line Lithography by M. J. Bowden and L. F. Thompson). Reactive ion etching and reactive ion beam etching are further techniques applicable in concurrent and continuous irradiation and removal of irradiated mold material.

Figure 6:
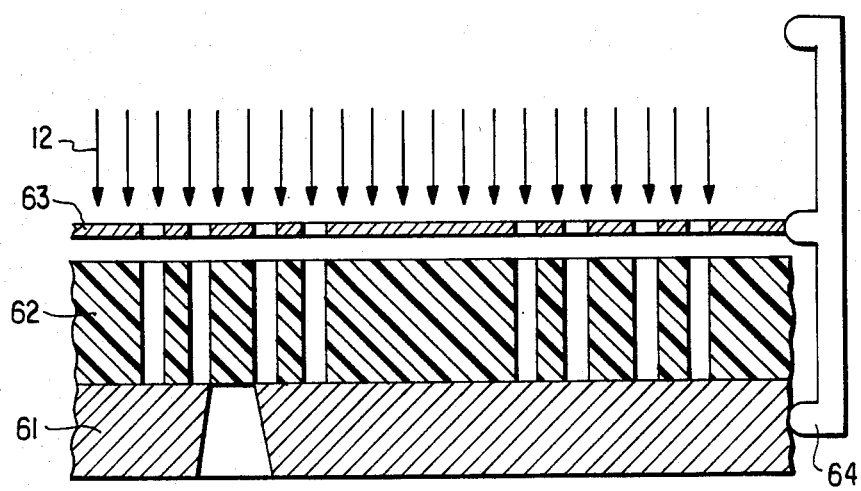
FIGS. 6 and 7 are cross-sectional schematic views illustrating the production of two combinations of separating bodies and cover plates where the separating bodies are applied to the cover plates in a mirror image.

FIG. 6 illustrates the production of a combination of a separating body and a cover plate 61. The mold 62 of the separating body is irradiated through the mask 63 and a separating body is formed similar to the procedure described in FIGS. 1–4. The position of the mask is defined by means of an alignment support 64.

Figure 7:
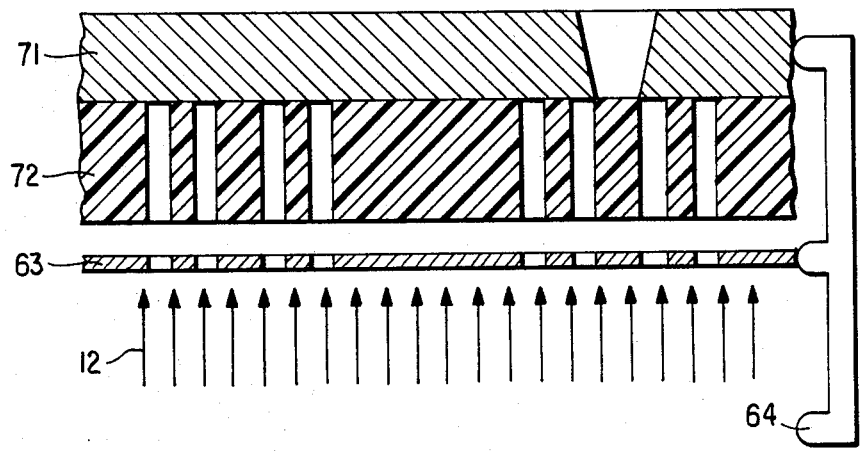

FIG. 7 illustrates the production of a corresponding separating body by a mirror symmetric irradiation through the same mask 63. The mold 72 of this separating body is attached to a second cover plate 71. Again the alignment support 64 is utilized for the mirror symmetric positioning of the mask 63.

Figure 8:
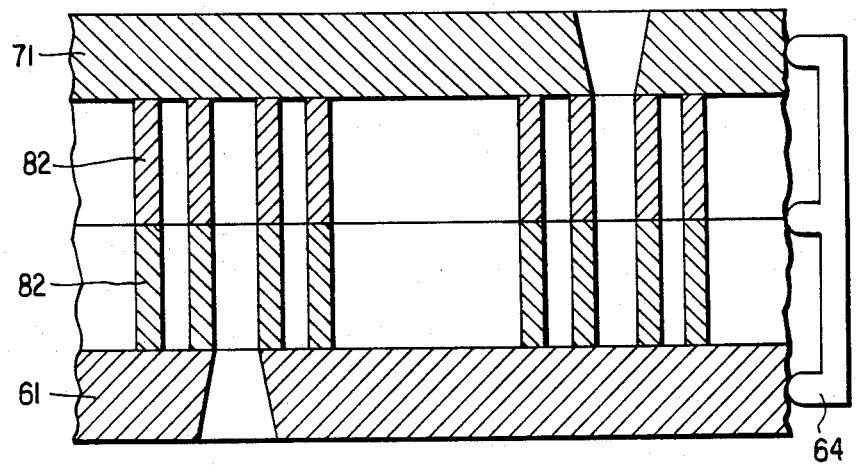
FIG. 8 is a corresponding cross-sectionial view of a complete separating element produced by assembling two such combinations.

FIG. 8 shows the assembly of the two combinations of separating bodies 81, 82 corresponding to the molds 62 and 72 and cover plates 61, 71, forming a complete separating element. In this way, the final separating body aspect ratio is doubled compared to the procedure described in FIGS. 1–5. The two parts of the separation element are fixed by means of the alignment support 64 and joined to each other.

It will be understood that the above description of the present invention is susceptible to various modifications, changes and adaptations, and the same are intended to be comprehended within the meaning and range of equivalents of the appended claims.

What is claimed is:

1. A method for producing a separating nozzle element composed of a separating body and two cover plates between which the body is interposed, the separation nozzle element being used for the separation of gaseous or vaporous mixtures, comprising:
   providing a layer of a material whose ability to be removed from the layer can be altered by irradiation with radiation of a selected type, the thickness of the layer being approximately equal to the thickness of the separating body;
   irradiating the layer, starting at one surface, with radiation which is of the selected type and which has a penetration depth into the material of the layer which is less than thickness of the layer, in a pattern corresponding to the cross-section of the separating body;
   removing from the layer material which is more easily removable as a result of said irradiation to form a mold of the separating body; and
   filling the mold with structure material which is compatible with the mixtures to be separated and removing the material constituting the mold to create the separating body;
   wherein said irradiation and said removal of material which is more easily removable comprise removing material at successively increasing distances from the one surface while causing the radiation to penetrate the material at successively increasing distances from the one surface as a result of the removal of the material.

2. A method as defined in claim 1 wherein said irradiation and said removal of material from the layer are carried out in alternating steps until material is removed throughout the entire thickness of the layer.

3. A method as defined in claim 1 wherein said irradiation and said removal of material from the layer are carried out continuously and concurrently until material is removed throughout the entire thickness of the layer.

4. Method as defined in claim 1 wherein said irradiation includes firmly attaching a mask presenting such pattern to the surface of the layer facing the source of the radiation.

5. Method as defined in claim 4 further comprising, before said irradiation and said removal of material, securing an electrically conductive cover plate to the layer, and said step of filling is effected electrochemically with the use of the cover plate as an electrode.

6. Method as defined in claim 5 wherein: said step of providing comprises mounting such a layer on a first electrically conductive cover plate and mounting such a layer on a second electrically conductive cover plate in a mirror image manner; said steps of irradiating, removing material from the layer, filling and removing material constituting the mold are carried out on both layers; and said method further comprises aligning the two parts of a separating element to be flush against one another and to be combined into a separating nozzle element.

7. Method as defined in claim 6 wherein the separating body presents through openings defining gas collecting chamber portions, and further comprising providing at least one of the cover plates with recesses located to constitute extensions of the through openings, to form therewith gas collecting chambers whose dimension in the direction between the cover plates is greater than the thickness of the separating body.

8. Method as defined in claim 5 wherein the separating body presents through openings defining gas collecting chamber portions, and further comprising providing at least one of the cover plates with recesses located to constitute extensions of the through openings, to form therewith gas collecting chambers whose dimension in the direction between the cover plates is greater than the thickness of the separating body.

9. Method as defined in claim 1 further comprising before said irradiation and said removal of material securing an electrically conductive cover plate to the layer, and said step of filling is effected electrochemically with the use of the cover plate as an electrode.

10. Method as defined in claim 9 wherein: said step of providing comprises mounting such a layer on a first electrically conductive cover plate and mounting such a layer on a second electrically conductive cover plate in a mirror image manner; said steps of irradiating, removing material from the layer, filling and removing material constituting the mold are carried out on both layers; and said method further comprises aligning the two parts of a separating element to be flush against one another and to be combined into a separating nozzle element.

11. Method as defined in claim 1 wherein the separating body presents through openings defining gas collecting chamber portions, and further comprising providing at least one of the cover plates with recesses located to constitute extensions of the through openings, to form therewith gas collecting chambers whose dimension in the direction between the cover plates is greater than the thickness of the separating body.

* * * * *